US 7,890,486 B2

(12) United States Patent
Claghorn (10) Patent No.: US 7,890,486 B2
(45) Date of Patent: Feb. 15, 2011

(54) DOCUMENT CREATION, LINKING, AND MAINTENANCE SYSTEM

(76) Inventor: Ronald Claghorn, 106 Tamarron La., Pasco, WA (US) 99301

( * ) Notice: Subject to any disclaimer, the term of this patent is extended or adjusted under 35 U.S.C. 154(b) by 398 days.

(21) Appl. No.: 12/187,260

(22) Filed: Aug. 6, 2008

(65) Prior Publication Data
US 2009/0043824 A1    Feb. 12, 2009

Related U.S. Application Data

(60) Provisional application No. 60/954,244, filed on Aug. 6, 2007.

(51) Int. Cl.
*G06F 7/00*     (2006.01)
*G06F 17/30*    (2006.01)
(52) U.S. Cl. .................. 707/705; 707/706; 707/736; 707/737; 707/758
(58) Field of Classification Search .......... 707/999.101, 707/705, 706, 736, 737, 758
See application file for complete search history.

(56) References Cited
U.S. PATENT DOCUMENTS
6,094,657 A * 7/2000 Hailpern et al. ............. 707/740

7,493,312 B2 * 2/2009 Liu et al. ..................... 1/1
2002/0194483 A1 * 12/2002 Wenocur et al. ............ 713/185

* cited by examiner

*Primary Examiner*—Jay A Morrison
(74) *Attorney, Agent, or Firm*—Robert L. Shaver (57) ABSTRACT

A document creation and citation system designed to maintain a database of reference documents. The content of a selected document may be automatically scanned and indexed by the system. The selected documents may also be manually indexed by a user prior to the upload. The indexed documents may be uploaded and stored within a database for later use. The system allows a user to generate new documents by selecting content within the reference documents stored within the database and inserting the selected content into a new document. The system allows the user to customize and augment the content of the new document. The system also generates citations to the selected content retrieved from the reference documents. The citations may be inserted into the new document in the appropriate location and format, as directed by the user. The new document may be uploaded into the database and included with the other reference documents. The system also maintains the database of reference documents so that when changes are made to a reference document, the author of a document referencing the changed document will be alerted to make appropriate changes to his document. The system also allows visual comparison of documents so that the user may see differences in the text of the documents.

14 Claims, 8 Drawing Sheets

(Update Function)

DOCUMENT CREATION, LINKING, AND MAINTENANCE SYSTEM

CROSS-REFERENCE TO RELATED APPLICATIONS

This application claims the priority date of the provisional application entitled THE PARALINK SYSTEM filed by RONALD CLAGHORN on Aug. 6, 2007 with application Ser. No. 60/954,244.

STATEMENT REGARDING FEDERALLY SPONSORED RESEARCH OR DEVELOPMENT

This invention was made with Government support under contract number DE-AC27-01V14136, awarded by the Department of Energy. The Government has certain rights in the invention.

FIELD OF THE INVENTION

The invention generally relates to an apparatus for generating and maintaining a document library containing cross-referencing documents, and more particularly to a work processor plug-in for generating, maintaining, updating, and augmenting a database containing information extracted from the documents including the detailed relationships between the documents.

BACKGROUND OF THE INVENTION

Maintaining a document library is a common problem for entities or groups that create a large number of documents. More particularly, it is often difficult to maintain an accurate alignment of ideas, concepts, descriptions, or requirements in the documents that cross reference one another. The reason for this difficulty is that the documents are constantly updated or amended. Changes to a referenced/referencing document must be reflected in the referencing/referenced documents in order to maintain consistency in information.

Known to the field of art are document reference systems that use preset forms and fields to capture information or place information in a document. The fields may be present in database records attached to a form or they may be embedded within sentences in a document. Each of the fields contains information that exists as a part of the document. The boundaries of each field must be established in order to operate in the system. Once populated, the information within the fields is uploaded into a database or otherwise copied to another location by the reference system. When an existing document is used to create a new document, the desired information is copied from a field in the existing document and inserted into a field in the new document. When the field in the older document is later amended, the content of the corresponding field in the newer document is updated, automatically, by the reference system.

There are numerous disadvantages that exist with the prior document reference systems. One disadvantage of prior systems is that they require the use of a special environment outside of the natural word processing environment of the user. Outside their native environment, the clusters of words that represent ideas, concepts, descriptions, or requirements lose their context, increasing the chances that they will be misconstrued or misused. Additionally, the operation of such systems often involves a tedious and complex series of tasks where users are required to transcribe information from a document to a form and/or establish fields within documents. Typically, a number of specially trained personnel are required to administrate, operate, and maintain the reference systems. Even with a dedicated staff managing the operation, the information managed by prior art systems may still become unwieldy and misaligned, especially when there are multiple document authors involved in creating a diverse set of documents for a constantly evolving project. Complexity and required man hours drives the cost of operation of the prior systems to unreasonable levels.

The prior systems do not work effectively in situations where "child" documents paraphrase text from the parent documents. Previous systems modify the exact contents of referencing child documents corresponding to changes made to parent documents, obliterating the work that went into paraphrasing the original into the child document. Since paraphrasing is a fundamental exercise when referencing authoritative literature in a new context, prior systems proved ineffective in this respect.

Thus, there exists a long standing and unmet need for a system that locates complete but singular ideas, concepts, descriptions, and requirements in a wide variety of documents so that the information can be readily and reliably extracted and used in other applications. There is a need for a system that automatically extracts the complete but singular ideas, concepts, descriptions, and requirements from parent documents so that they may be paraphrased in child documents while maintaining a one-to-one relationship, greatly simplifying and focusing consistency checks between the parent and the child. This functionality will allow later changes made to a parent document to be tracked and reflected in a child document without affecting the paraphrasing in the child document. There is a need for a document management system that runs in the native word processing environment of the user and does not require a plethora of highly-trained staff to make it operate effectively. Many fields of industry deal with the arduous task of generating new documents and citing existing documents in a correct and time-efficient manner, thus there is a substantial need for a new system meeting the qualifications listed above. There is a need for a document management system which utilizes and retains paraphrasing created in child documents.

SUMMARY OF THE INVENTION

The current invention is a document creation and maintenance system that operates within the environment of a word processor. The current invention may be embodied as a plug-in or extension that operates within a word processor or other type document preparation system familiar to a user. The invention allows users to upload information from a wide variety of documents into a working document database. The invention creates links between clusters of words (typically paragraphs) in different documents to facilitate the flow of information from one document to another to maintain alignment of the information within the library and between documents.

The current invention also allows the user to generate new documents using word clusters selected from documents already stored in the database alongside the new text generated by the user. When a user drafts a new document using the inserted clusters, the system of the invention automatically provides the user citations and links to the documents from which the inserted text was drawn. The user may insert the citations in a number of different formats within the new document. Additionally, the user may augment or change any of the inserted text or citations within the new document without affecting the links.

The working database is populated by uploading clusters of words from documents into the database. Prior to uploading a document, the invention preprocesses the text of the document. The preprocessing step involves the scanning the document for symbols, images, tables, and graphs, and a step of coding and uploading symbols into the database. The invention is capable of reading both standard text as well as other elements associated with symbols in computer-aided drawings. Elements such as symbols and figures are replaced with code that can be stored in a database and is decoded by the current invention as well as other applications that recognize HTML, the language that is used to create web pages. The purpose for the conversion is to allow the current invention and web pages to later reproduce the symbols present in the original document.

The symbols and figures in the original document are now visible as recognizable codes that can be uploaded along with the document into the document database that is managed in the background. The placement and formatting of the text in the original document otherwise remains intact. The codes that replaced the symbols in the original document are converted back to symbols in the output managed by the system.

After the symbols and figures have been replaced, a text parsing function is executed by the system. The default text parsing function uses the breaks in paragraphs or other document structures such as rows in a table or cells in a CAD drawing. The text parsing function sets markers, separating the document into a plurality of discrete clusters of words that convey ideas, concepts, descriptions, or requirements.

The markers set by the text parsing function appear in the native environment as non-printing elements. The appearance of the printed document, as viewed by an ordinary reader, remains unaltered. The current invention allows the user to adjust the position of the markers, while viewing the bounded cluster of words in its original context. This adjustment function is a response to authors who insert more than one idea, concept, description, or requirement into a single paragraph or who use multiple paragraphs to convey one complete idea, concept, description, or requirement (e.g. a bulleted list). A user may move, add, or delete the markers to refine the words within the cluster so that the cluster conveys only one complete idea, concept, description, or requirement.

Once the markers are placed in the document, the invention generates a unique identification code for each cluster of words. The identification codes remain visible only in the background of the document but may be brought to the foreground in a separate window invoked with a "right-click" of the mouse. After the assignment of the identification codes, the user may upload the document into the working database that maintains only the most current version of the document—i.e. the document "baseline". In the case of a document that is new to the system, the user is presented with editable citation data that was mined from the document properties or, in the case of a web page, is based on the web address.

After the user has retrieved the discrete clusters from the parent documents containing the matches provided by the text segment selection function, the user may execute a child document development function. The child document development function allows the user to insert text into a child document. The inserted text is the selected text, drawn from the discrete clusters of the relevant parent documents. The user may electively insert the identification codes of the clusters in the parent document within the citations. Also retained with the inserted text is the formatting of the words in the parent document such as bolding and italics. The reliable replication of superscripted and subscripted text is especially important to the readability of the text that uses such formatting. For example, text that contains chemical or mathematical formulae are difficult to read (or even inaccurate) without the subscription and superscription of applicable text.

Once the clusters in the child document are defined by the markers, a child cluster identification code assignment function is executed. This function assigns a unique identification code to the discrete word clusters in the child document. The identifiers for the child clusters are only viewable in the formatting background of the word processor.

Another function of the current invention is the creation of links between two documents that have been uploaded into the working database. This is useful in a situation where a child document was been created without using the current invention to automate the creation of citations and links. The current invention facilitates the retro-linking of word clusters in one of two ways: two views of the working database are presented to the user whereby the user creates a link via a drag and drop sequence between the views, or the user selects a marked area within a document and performs a right click to start a word search for related text in other documents. In the latter case, matches are identified from the search results to create the links.

As discussed above, in the event the parent document identification codes are electively retained within the inserted citations in the child document, the invention will automatically generate links between the word clusters in the parent document and the corresponding word clusters in the child document. If the parent document identification codes are not retained in the discrete clusters of the child document, other operations are necessary to generate the links. These operations are discussed below.

It is important to note that child clusters may be linked to a plurality of parent clusters. Similarly, there are no bounds to the number of links between a parent and child clusters within other documents.

Figure 4:
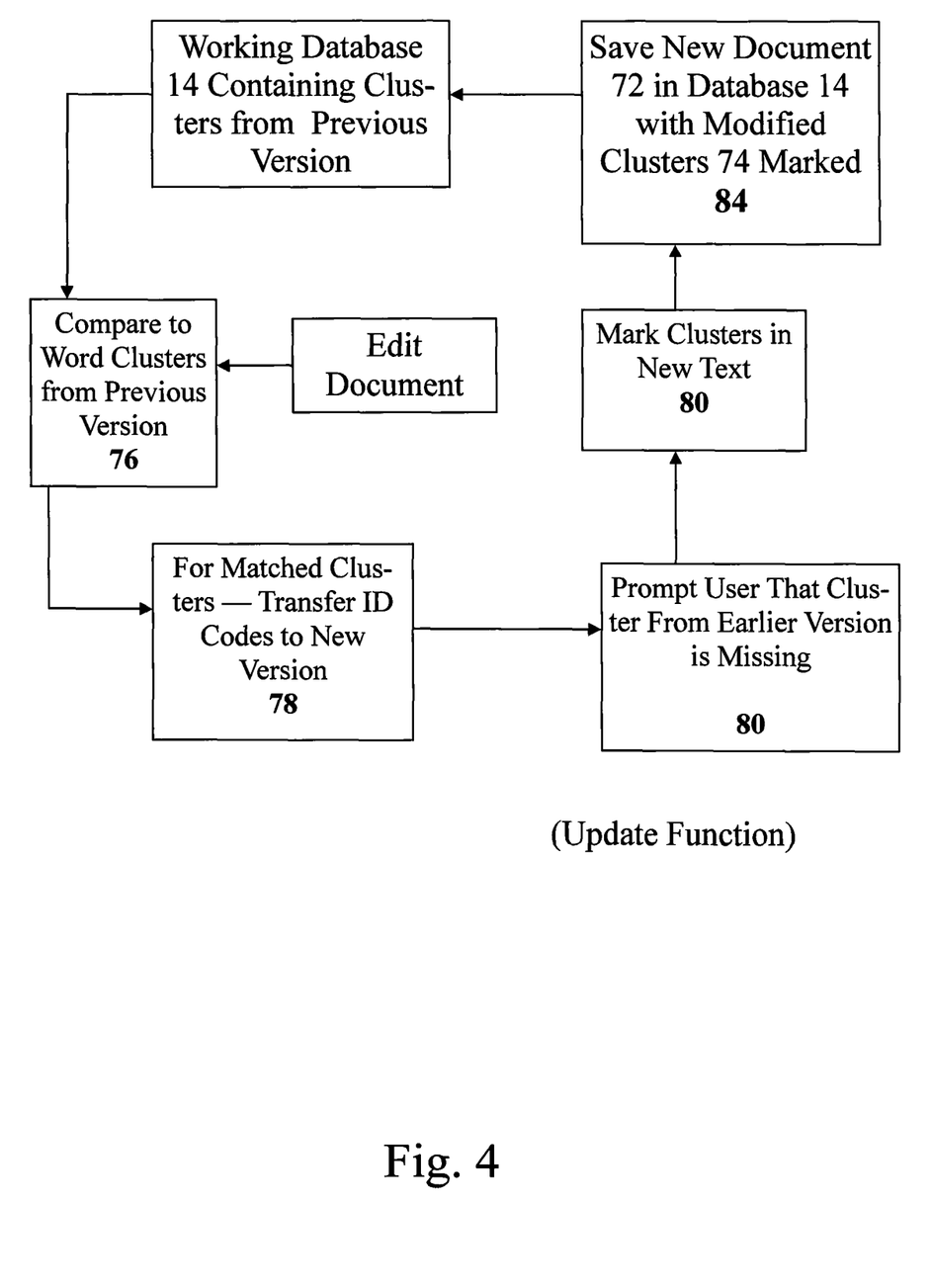
FIG. 4 is a diagram of the update function of the system.

The greatest time-saving feature of the current invention is the database update function, shown in FIG. 4. In this case, a document author adds, modifies, or deletes words in a document to create a new version 72 of the same document. The modified clusters 74 that are stored in the working database 14 for the document 12 are then used to find similar clusters in the new version 72 at step 76. The identification codes given to the clusters 20 in the previous version of the document are transferred to the similar clusters found in the new version 72 at 78. If a cluster 20 that was in the previous version of the document appears to be missing, the user is prompted at 80 to verify that the cluster has been deleted. Otherwise, the matching cluster in the new version is highlighted as ready for upload. New clusters are marked at step 82 and uploaded in step 84.

It is important to note that the database update function sets the markers in the revised document based on the similarities of the clusters in the new version of the document to the clusters in the previous version. The clusters in the new version would include new words that have been added and the clusters would be missing the words that were deleted from the old version. Subsequent analysis of the clusters in the revised document versus clusters stored in the working database will identify these clusters as "modified". The differences between the two versions would then be used to focus the user's attention for determining impacts to child documents that reference the document.

If a cluster in the revised document is highly revised or edited, "good" matches between the old and the revised documents may be too difficult to determine by automated means. In this case, the current invention will present the user with candidate word clusters that best match the clusters in the old version of the document. If the user determines that one of the suggested matches is relevant, he accepts it for use to set new markers around the cluster in the revised document.

After the cluster identification marks and codes are transferred to the corresponding clusters in the updated version of the document, the new version is scanned for clusters of words that are not highlighted. These clusters are marked, highlighted, and given identification codes in preparation for upload to the working database. Subsequent analysis of the clusters in the revised document versus clusters stored in the working database will identify these clusters as "new".

Another significant function of the current invention is the generation of citations in a child document. The links between the discrete clusters in a parent document and a child document are used to generate the citations. The citations are placed within the child document to describe the parent document from which the referenced or inserted text was drawn. The citations may be placed anywhere within the child document and may be formatted as footnotes, formal citations, scientific references, or any other bibliographic citation form. The content and the format of the citations are customized by the user. The current invention stores the customized format so that all of the citations in the document are similar. However specific citations may be moved, edited, deleted, or otherwise augmented once they are generated and inserted into the child document.

The document comparison function also has the capability of highlighting the differences between the parent and child documents. The system creates a report that displays the content of linked clusters for a side by side comparison. As an option, the user can request a strikethrough of words that are absent in the child cluster and a highlighting to denote words that have been added to the child cluster. As another option, the differences in sequences of words may be noted with strikethroughs and highlights.

Figure 5:
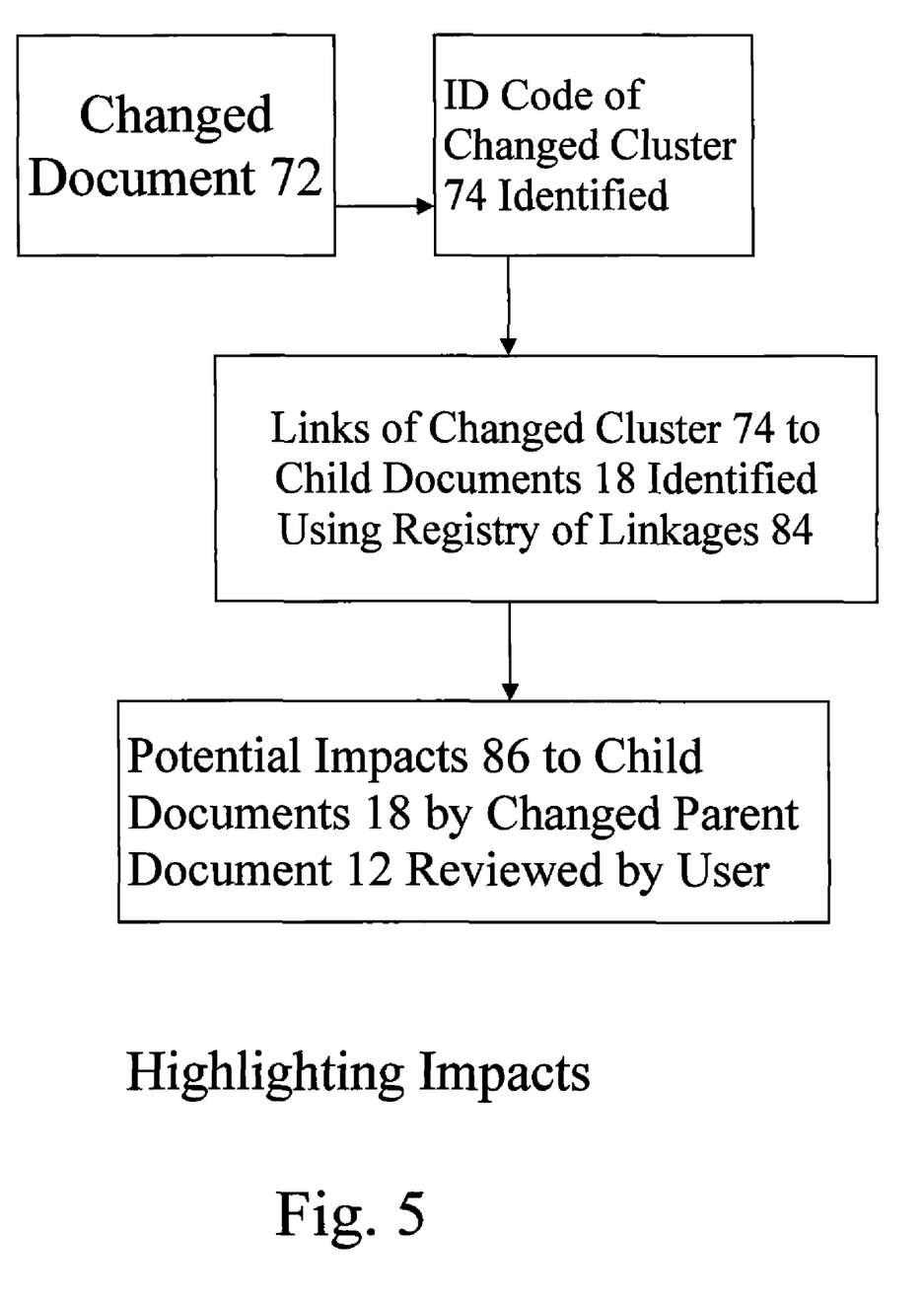
FIG. 5 is a diagram of the impacts notification function of the system.

Yet another key functionality of the invention is the capability of highlighting the potential impacts of changes made to the content of the documents stored in the working database, shown in FIG. 5. For example, if the content of a document is changed to form a new version 72, the current invention identifies the specific clusters 74 of words that were changed (at step 82 of FIG. 5, and uses the registry of linkages 84 to highlight potential impacts 86 to specific clusters 22 in child documents. This functionality assists the authors of child documents by focusing their attention on changes. If the change is significant, the authors of child documents would then be required to make the appropriate changes to their documents. After the child document is amended, it may be uploaded to the working database so that the child clusters are consistent with the baseline identified in the parent clusters.

The invention presents a view into the working database depicting the hierarchical relationships of the documents. The database may use metadata, network, facilities, secure access, or other file organization system now known or yet to be developed. The file system may store files in a local access network, an organizational intranet, a disk or flash system, a mainframe, a plurality of systems connected through the internet or an intranet, or other storage system or apparatus now known or yet to be developed.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The invention uses words to define an object (an idea, concept, feature, or requirement) in a document rather than some sort of obvious boundary in the text of the document such as a paragraph marker. The default object is defined by the paragraph, a table row, a symbol (in a drawing) placement, or simply the cluster of words that are copied from a web page. The default works most of the time, but not always, which is why it is important to have the ability to add or subtract words from the cluster.

In a web page, for example, prior art systems provide no means to set and adjust visible markers around a cluster of words on the page. The system of the invention will identify a pre-defined cluster or words on a web page even though the cluster may have been modified in an updated version of the web page. Additionally, the cluster may be recognized in some paraphrased form in some other (child) document without the benefit of a citation.

The time saved by using this concept compared to prior art systems is significant:

There is no need to customize a system to retrieve information from a particular place in some document or form or spreadsheet. In prior art systems this is the system configuration mode which is eliminated by this invention.

A minimally-structured document can be imported into a database within seconds, whereas in prior art systems the input must be in some structured form before it can be imported.

Updating records in the database to reflect an updated document is done within seconds, whereas in prior art systems each affected record must be located and each affected field must be updated with a cut-and-paste operation. Prior art systems that transfer exact copies of text to update records in another location such as a database require extensive configuration to associate the source with the destination.

The links between clusters of words remain intact even though the clusters are modified or moved within a document, unlike in prior art systems in which links may be inadvertently obliterated during the editing process.

Child documents start off in better form in that the initial paragraphs are limited to a single topic (an idea, concept, feature, or requirement taken from the parent document) which makes the child document easier to write and compare to the parent for consistency.) because the paragraphs in the child document are initiated with one idea, concept, feature, or requirement.

A common problem for organizations that employ multiple document drafters is the maintenance of a database containing the documents. The documents contained in such databases are often written in a manner that cross-reference one if not many of the other documents in the database. Major problems arise when a referenced document is revised and edited and the referencing document is not amended to comply with the changes to the referenced document. In the past, complex computer systems and software were used to address these problems. These systems aimed to make automatic changes or at least prompt changes to documents that referenced a revised document. The systems required specialized workers to take documents from their native word processing environment and format them into a special system. The systems are expensive, cumbersome, and often complicated and prone to failure. These systems prove ineffective when documents were frequently edited or revised. The prior systems also prove ineffective when referenced material is paraphrased in a referencing document. Since paraphrasing is the sine qua non of referencing documents, the prior systems never achieve their true intended purpose.

The current invention is a document creation, linking, and maintenance system. The current system allows a user to create and upload documents of various types and forms into a working database. The system allows a user to link content of one document to matching content in another document on the database, while recognizing paraphrasing. The system recognizes changes made to documents and notifies authors of documents that reference the augmented document. The system operates in the native word processing environment of the document author, editor, or secretary. For example, a preferred embodiment of the invention is as a Microsoft® Word® add-in. The system collects paragraphs from word processing files, cells from computer-aided drafting (CAD) files, snippets of information from web pages, or any text, image, or symbol that may be copied and pasted into a document. The system formats the content to be uploaded into the database so that it is readily available to assist with the development and maintenance of other documents that draw from the collected data. This tool is especially useful in an environment where documents are being created from references that are (at least potentially) modified rather frequently. This is usually the case when a complex product is on a rather short deadline.

In the following description and in the figures, like elements are identified with like reference numerals. The use of "e.g." "etc," and "or" indicates non-exclusive alternatives without limitation unless otherwise noted. The use of "including" means "including, but not limited to," unless otherwise noted.

Figure 1:
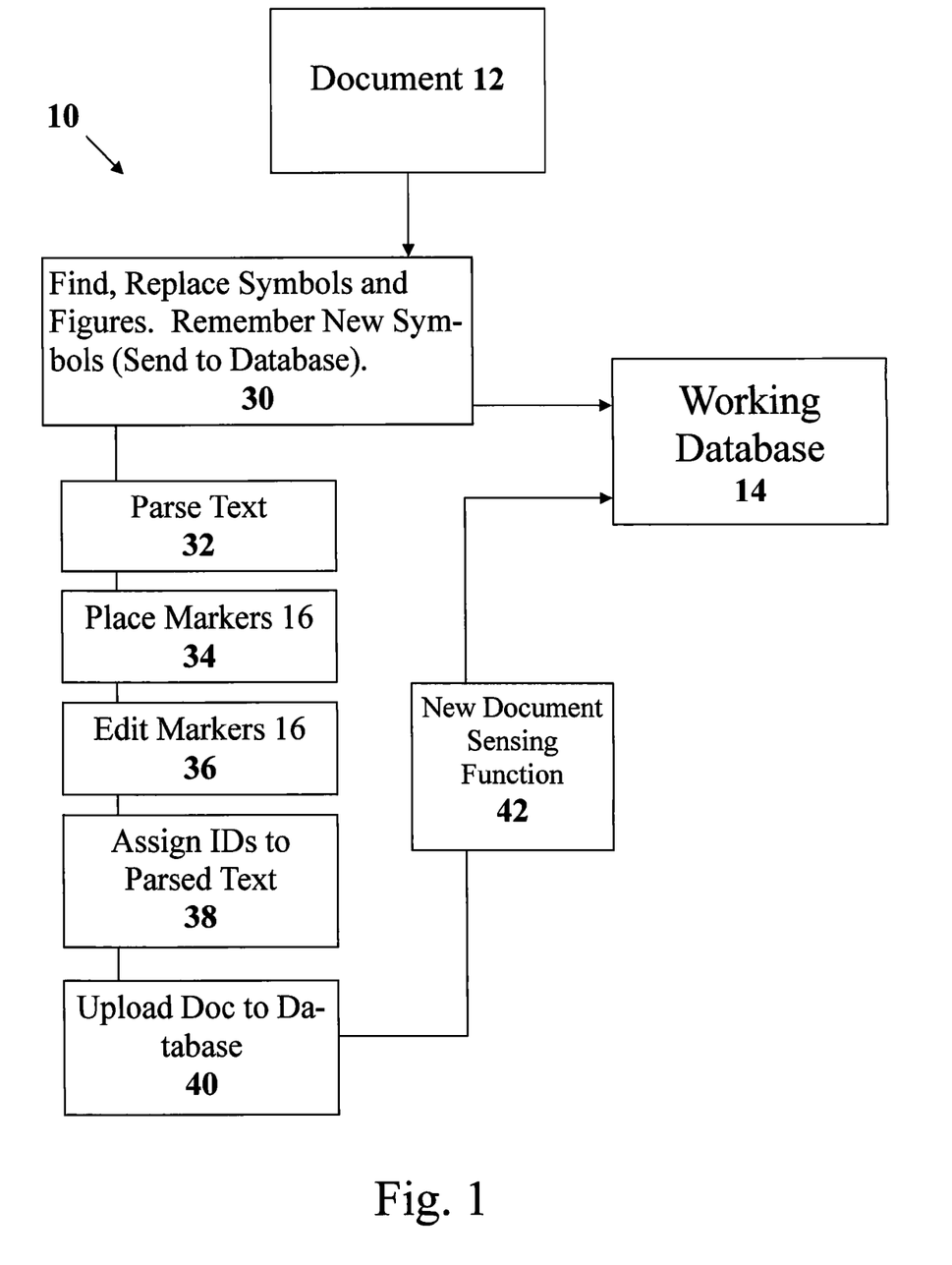
FIG. 1 is a diagram of the function of entering a document into the working database of the system.

The document creation, linking, and maintenance system operates as an add-in to a word processor. Therefore, the current invention is operated and controlled within a word processor program. The system of the invention is designated as at 10 in the figures. The first step in uploading a document 12 into the working database 14 is the step of searching and replacing the non-text elements of the document, such as symbols or images. This is shown in FIG. 1 at step 30. This is achieved by the user clicking a button on a drop down menu for the system 10 in the word processor. Clicking the button starts two functions, a symbol search and a replace function and an image search and replace function. Any symbols used in the text (e.g. ® or ≦) are replaced by code format that is recognizable by not only the system running in the word processor, but other applications such as a web page. Codes referencing the images are also created within a word processor file.

The codes for the symbols and figures in a document are typically stored in the document file in some proprietary format. The symbols and figures wouldn't be recognizable in the working database if they were stored in the proprietary format. Further, the results of an ad hoc query that contained a symbol or query would look like a group of scrambled characters. It is therefore preferable to store symbols and figures as decipherable codes within the word clusters stored in the database.

The system 10 facilitates the separation of text and codes in the document into meaningful clusters of words prior to upload to the working database 14. An automated text parsing function is executed at step 32 by the user by selecting a button on the drop down menu for the system. The automated text parsing function 32 runs an algorithm that detects boundaries based on paragraph marks and other codes embedded within the text of the document. The automated text parsing function then places markers 16 at the default boundaries, shown in step 34. The markers 16 are preferably embodied as barely visible square brackets that are placed on either end of a cluster of words.

Next, a manual marker relocation function may be executed in order for the user to adjust the placement of the markers around the default clusters located by the algorithm, at step 36. The markers may be adjusted to include additional words if the default cluster is deemed to be an incomplete expression of an idea, a concept, a feature or a requirement. Likewise, the markers may be moved if the default cluster contains more than one idea, concept, description, or requirement. The user may also delete marks so that uninteresting text won't be uploaded into the working database.

It is important to note that the text and code of a document may be entirely marked into discrete clusters of words or only specific portions of the document may be marked as such. In either case, the entire document remains intact so that the context of the marked clusters is clearly evident.

Once the markers are placed, a third button may be depressed in the drop down menu to initiate an identification code assignment function 38, which assigns a unique identification code to each marked cluster in the document. The identification codes are visible to the user only as attached information maintained in the background behind the visible text. A highlighting function notes which clusters qualify for an upload into the working database. The highlighting allows the user to verify the specific clusters that will be uploaded to the working database.

The system allows the user to upload the document containing the marked clusters into the working database 14 at 40. The upload is executed by a user depressing a fourth button in the drop down menu, thereby activating a new document sensing function.

The new document sensing function 42 looks within the document file to determine if the document is new to the system or if the document is an updated version of a previously loaded document. If the document is new to the system, it is given a unique identifier (if one is not already embedded in the file) and the current invention presents the user with additional information that was pulled from the file that might be useful for creating a citation.

In one preferred embodiment, the invention provides for a view into the information stored within the working database. To help the user visualize the relationships of documents and word clusters, the information is presented as a hierarchical tree to represent document lineage and information flow. For example, a parent document is located higher in the tree than child documents. Parent clusters are shown as "defining" the content of "complying" children.

In one preferred embodiment of the invention, multiple databases may be managed by the system. There may be working databases as well as specialized project reference databases that are optimized for searches. All of the working and reference databases connected to the system operate in the same manner. If a document managed within the working database would be useful as a general reference, the user may place the document in one or more of the project reference databases so that the document may be accessed as a reference.

Once the working database has extracted the clusters from a library of documents, a cluster selection function may be executed to retrieve relevant information from the database. The relevant documents will contain clusters of words representing complete but singular ideas, concepts, descriptions, and requirements that the user desires to reference or input within a child document. There are a couple of options in which to use the cluster selection function. The user may elect to search for specific words that may be within headings, captions, endnotes, and footnotes. The scope of the search may be the entire working database, one of the project reference databases, or in a specific location such as a specific branch of the document hierarchy or within specified documents. Alternatively, the user may input a document name, location, or an identification code of a word cluster in order to retrieve the desired text.

Figure 2:
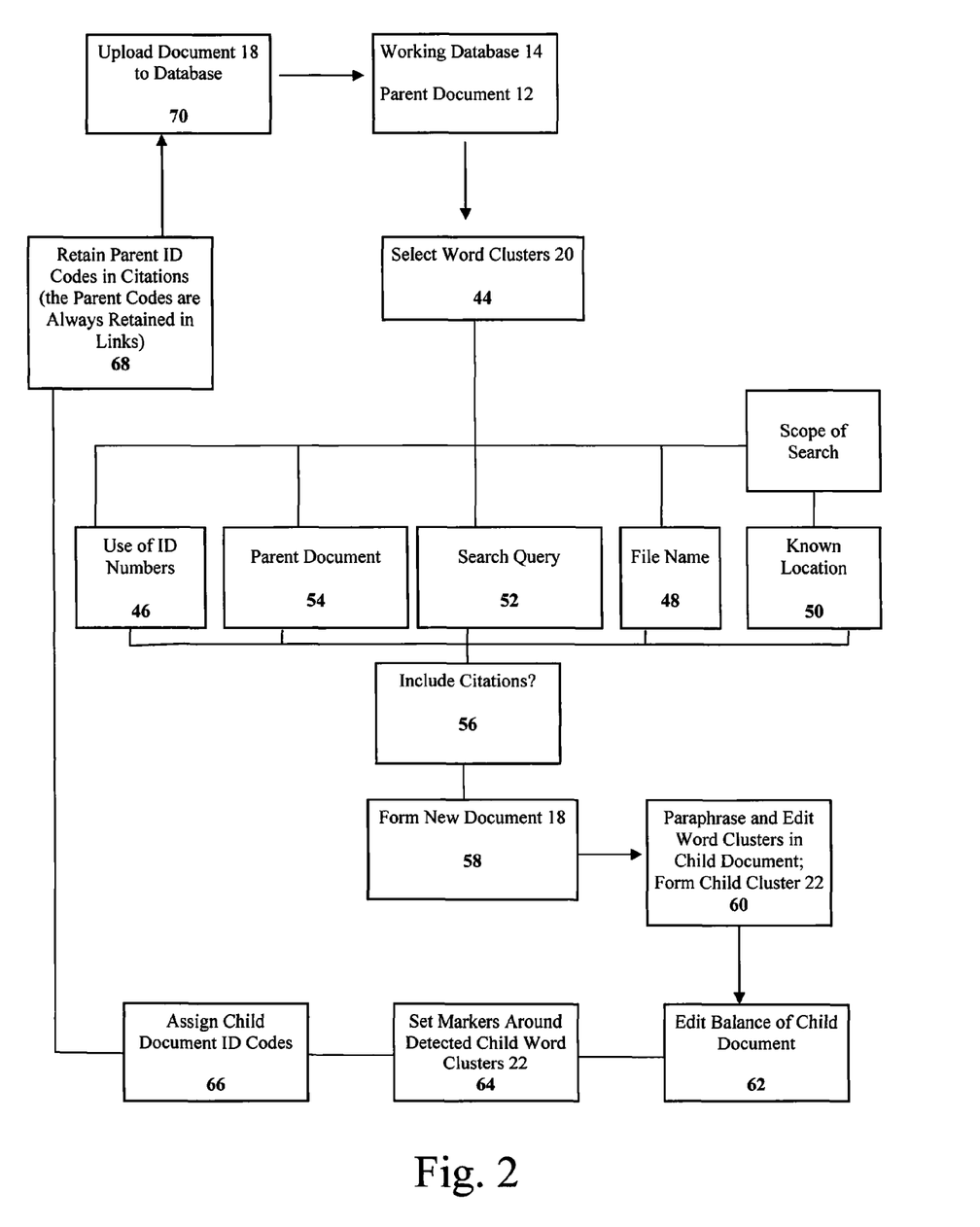
FIG. 2 is a diagram of the child document creation function of the system.

A key function of the current invention is the capability of assisting the user in drafting new documents shown in FIG. 2. When a user drafts a new document 18, the current invention allows the retrieval of word clusters 20 at step 44 from older parent documents 12 now stored in the working database 14 for use as reference materials in the new child document 18. This retrieval may be accomplished in a number of ways. Word clusters may be selected from a chosen parent document 12, as at 54. Word clusters 20 may be retrieved from parent document 12 using identification numbers shown at 46, or the file names or known locations, steps 48 and 50, of the parent documents may be used for retrieval from the working database file system. Otherwise relevant clusters may be retrieved by running a search query at 52 in the working database using a search string consisting of key words. Either way, the user may select desired clusters from retrieved parent documents 12. The selected clusters 20 may then be inserted into the child document 18. At the discretion of the user, the citations in the child document may contain the identification codes of the parent clusters thereby linking the child to the parent, shown at 56, forming a new document, a child document 18 at box 58.

Next, the user may augment the inserted clusters by paraphrasing, deleting, adding to 58, or otherwise changing the words in the word cluster 20 forming a child cluster 22 at box 60. The linkages between the clusters in the parent and child documents remain intact, the child document 18 is edited at box 62. The benefits of the initial effort to identify and then extract only those clusters that express complete but singular ideas, concepts, descriptions, or requirements in the parent document is now clearly evident in that the child cluster is set for a focused, one-to-one comparison with the parent.

Once a final draft of the child document is complete, markers are set around detected child clusters 22 as described above at step 64. The current invention assigns new identification codes to the clusters of the child document 18 at box 66. These identification codes are unique and distinct from the parent identification codes that may be embedded within the citations in the child document. The child identification codes are linked to the parent document through the identification codes embedded in the citations in the child document.

Once the identification codes are assigned to the word clusters in the child document, the user may upload the child document into the working database. When uploading the child document, the user again has the option to remove or retain the parent identification codes within the inserted citations. If the child document is new to the system the current invention presents citation data to the user for verification and/or adjustment of the data that would be used if the child document were to be referenced in another document.

Next the user may elect to paraphrase the inserted words to make them more meaningful in their new context. New words are also needed to create transitions to the word clusters imported from the parent document.

Next, the automated parsing function is executed for the child document as described in 0042 and 0043. The result of these operations is that the codes and words of the child document are separated into discrete clusters. The use of identifiers in citations within word clusters rather than predefined fields to parse the document allows the user to substitute and rearrange words to the point that it no longer matches the cluster present in the parent document. This flexibility allows the user to paraphrase the information drawn from parent document and still track relevant changes in the parent document to the child document.

Next, an automated linking function is executed to generate links 24 between the discrete clusters 22 of the child document 18 and the discrete clusters 20 of the parent documents 12. The links are generated to contain both the identification code representing the parent document discrete cluster and the corresponding identification code representing the child document discrete cluster. There is also a manual linking function that allows links to be manually created to contain both the identification code representing the parent document discrete cluster and the corresponding identification code representing the child document discrete cluster.

A registry of links is maintained by the system within the working database. The registry of links contains all the links between all the parent document discrete clusters and the child document discrete clusters.

Figure 3:
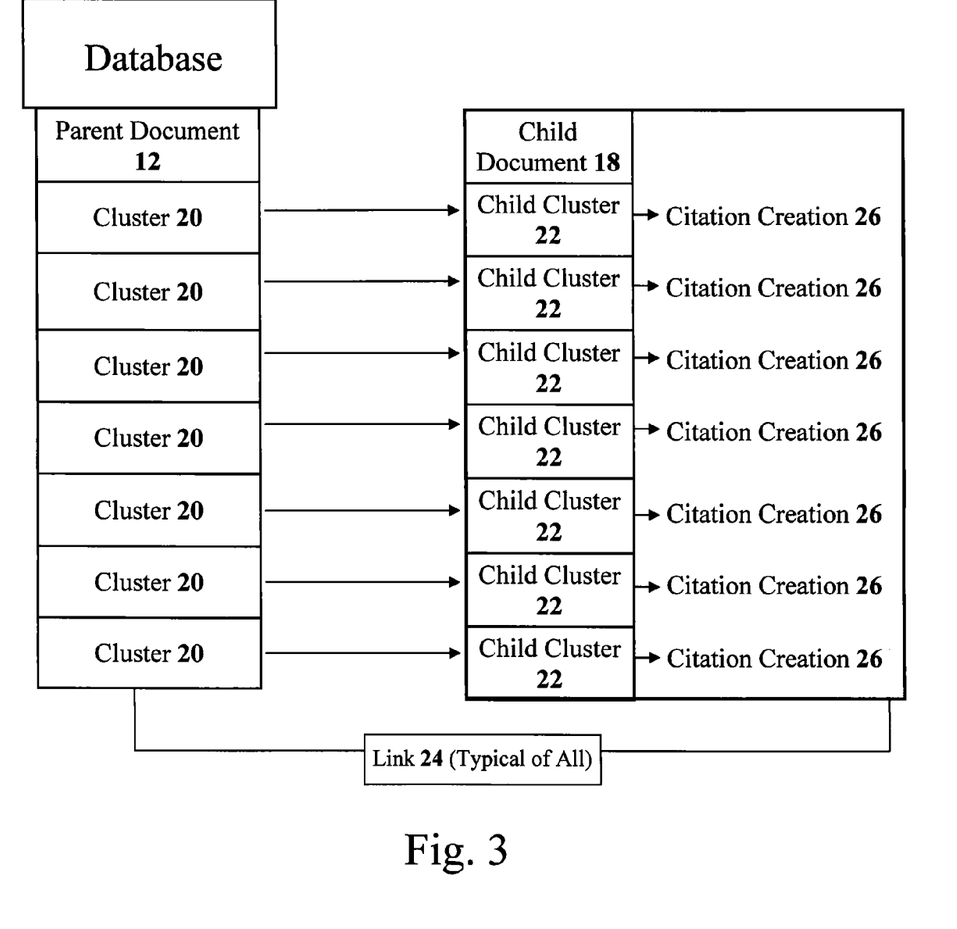
FIG. 3 is a diagram illustrating the citation creation function of the system.

The system also has an automated citation function, shown in FIG. 2 at box 68, and shown in FIG. 3. The automated citation function uses the links 24 to generate citations 26 that may be inserted in the child document 18. The citations 26 reference the parent document and may be formatted in many ways. When the text is selected from the parent document to be placed into the child documents, the system allows the user to specify the format in which he wants the citations generated. The citations are inserted into the text of the document at locations specified by the user. The citations may be a table of references, an index of authorities, footnotes, or citations directly within the written text of the document. The citations may also be altered, edited, reformatted, moved, or removed once they are inserted into the document.

Next the child document may be uploaded at box 70 in FIG. 2. The child document upload function allows the user to either retain or remove the parent document identification codes from the child document prior to uploading the child document into the working database. The links corresponding to the child document are retained in the registry of links when the child document is uploaded.

A database update function, shown in FIG. 4, is executable on any document within the working database. This function is executed whenever a new version of the document becomes available. The database update function searches for "good" matches between the text of the discrete clusters of the new version of the document and the clusters stored within the working database representing the previous version.

The greatest time-saving feature of the current invention is the database update function, shown in FIG. 4. In this case, a document author adds, modifies, or deletes words in a document to create a new version 72 of the same document. The modified clusters 74 that are stored in the working database 14 for the document 12 are then used to find similar clusters in the new version 72 at step 76. The identification codes given to the clusters 20 in the previous version of the document are transferred to the similar clusters found in the new version 72 at 78. If a cluster 20 that was in the previous version of the document appears to be missing, the user is prompted at 80 to verify that the cluster has been deleted. Otherwise, the matching cluster in the new version is highlighted as ready for upload. New clusters are marked at step 82 and uploaded in step 84.

It is important to note that the database update function sets the markers in the revised document based on the similarities of the clusters in the new version of the document to the clusters in the previous version. The clusters in the new version would include new words that have been added and the clusters would be missing the words that were deleted from the old version. Subsequent analysis of the clusters in the revised document versus clusters stored in the working database will identify these clusters as "modified". The differences between the two versions would then be used to focus the user's attention for determining impacts to child documents that reference the document.

If a cluster in the revised document is highly revised or edited, "good" matches between the old and the revised documents may be too difficult to determine by automated means. In this case, the current invention will present the user with candidate word clusters that best match the clusters in the old version of the document. If the user determines that one of the suggested matches is relevant, he accepts it for use to set new markers around the cluster in the revised document.

After the cluster identification marks and codes are transferred to the corresponding clusters in the updated version of the document, the new version is scanned for clusters of words that are not highlighted. These clusters are marked, highlighted, and given identification codes in preparation for upload to the working database. Subsequent analysis of the clusters in the revised document versus clusters stored in the working database will identify these clusters as "new".

If a "good" match is found, the document parsing function is used to set markers around the boundaries of the matching cluster in the revised document.

If a "good" match is not located by the database update function, a prompting function alerts the user that the matching cluster was not recovered and provides a listing of suggested matches within the revised file. The prompting function allows the user to either select the suggested match or browse the revised document to hand select the matching cluster.

Next the document upload function described above allows the user to replace relevant records in the working database with the information from the clusters that are present in the new version of the document.

Yet another key functionality of the invention is the capability of highlighting the potential impacts of changes made to the content of the documents stored in the working database, shown in FIG. 5. For example, if the content of a document is changed to form a new version 72, the current invention identifies the specific clusters 74 of words that were changed (at step 82 of FIG. 5, and uses the registry of linkages 84 to highlight potential impacts 86 to specific clusters 22 in child documents. This functionality assists the authors of child documents by focusing their attention on changes. If the change is significant, the authors of child documents would then be required to make the appropriate changes to their documents. After the child document is amended, it may be uploaded to the working database so that the child clusters are consistent with the baseline identified in the parent clusters.

The system additionally has a document modification tracking system that tracks modifications in documents. The document modification tracking system uses the registry of links to alert authors/users of child documents when changes that are made to parent documents may have impacts on child documents. Significant changes that are detected in parent documents would require the authors of the child documents to make corresponding changes so that the information in both documents are realigned once again.

Figure 6:
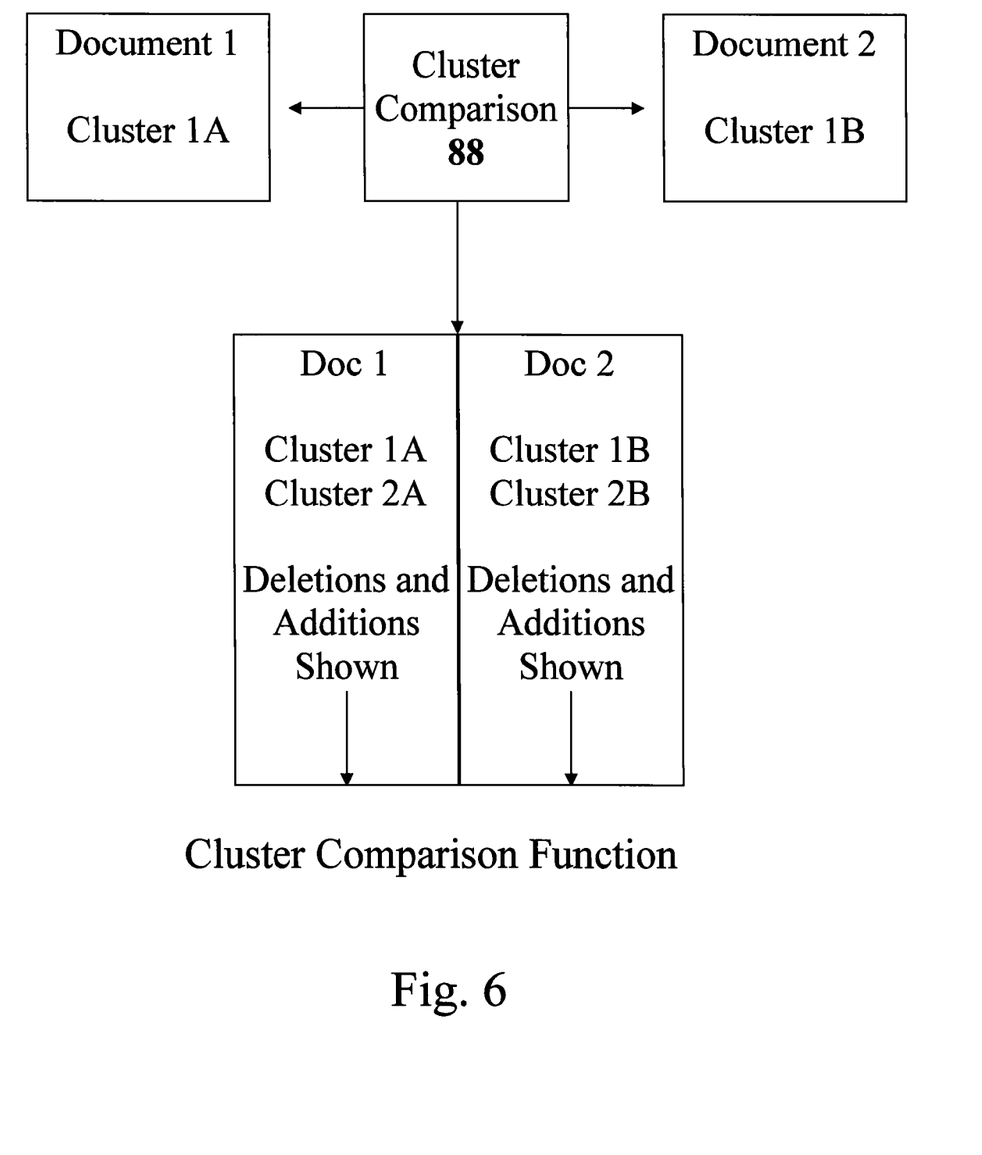
FIG. 6 is a diagram of the cluster comparison feature of the system.

The invention also includes a cluster comparison function 88, shown in FIG. 6 that presents the clusters from one document next to updated clusters and/or the linked clusters in other documents. This function is especially useful when assessing inconsistencies between documents or the impact of changes in documents. The invention marks the words in the selected clusters to indicate discrepancies. For example, if a parent cluster 20 is amended, the system will analyze the old and new versions of the cluster so that deleted text is indicated with a strikethrough and new text is highlighted. As an extension of this report, child clusters 22 that are linked to the modified or deleted clusters are presented alongside the parent clusters.

Figure 7:
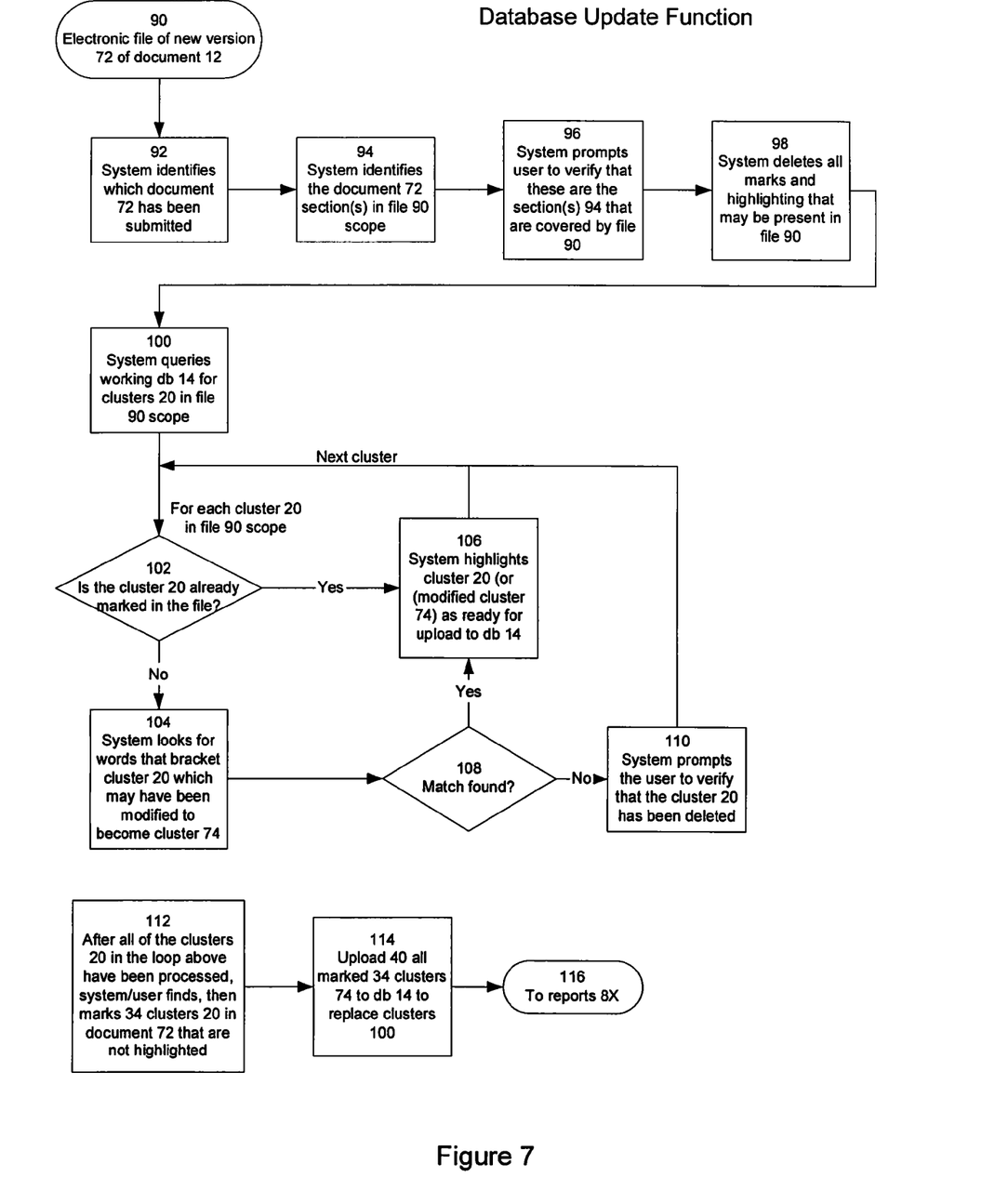
FIG. 7 a diagram of the database update function of the document management system.
Figure 8:
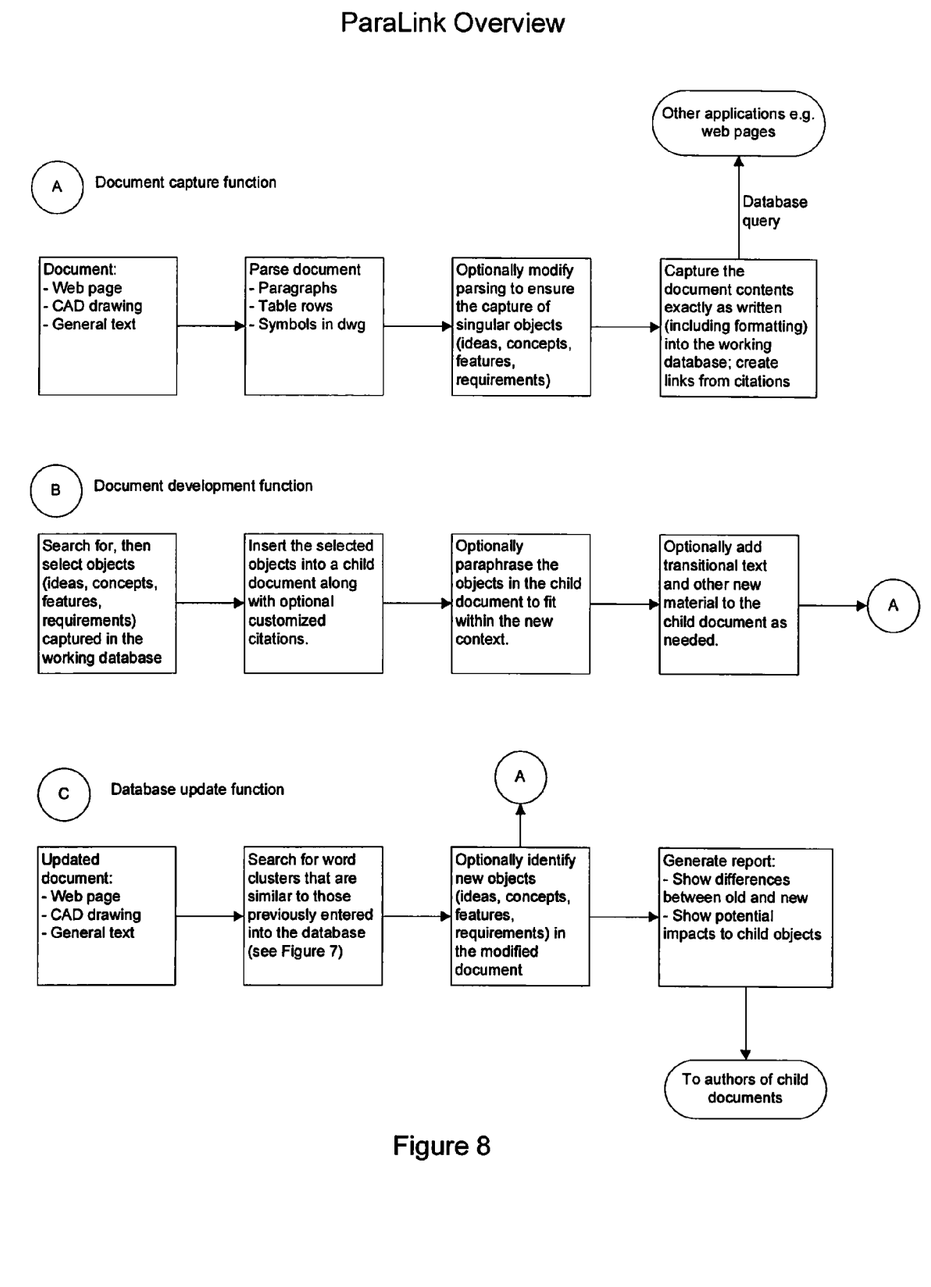
FIG. 8 is an overview of the paralink system showing the document capture, the document development, and the database update functions of the document management system.

FIG. 7 shows details relating to the database update function. This function would be activated when changes to a document that is stored in the database are made and when those changes are ready to be recorded. The process starts at Box 90, in which the new version 72 of a document 12 is received. At block 92, the system identifies document 72 by the embedded identification number or code in that document and relates that document to the earlier document which was stored in the database. At block 94, the system identifies the scope of the file. By scope it is meant the files that are associated with the revised document 72. This could be files such as chapter files or other related documents that are associated with new person 72. At block 96, the user is prompted to verify the scope that the system has identified for new version 72. At block 98, all of the marks and highlights that are embedded within the text of the new document 72 are deleted, leaving the document 72 with no marker characters. At block 100, a loop begins which is really started in block 102. In block 102, a cluster in the new version 72 is identified and the system is queried if the modified cluster 74 is already marked in the file. If it is, then the cluster is highlighted as being ready for upload to the database in block 105. If it is not ready to upload then the system queries if the cluster 74 is in the working database 14. If the answer to that query is 'yes,' then at block 106, the instruction is carried out to look for a matching cluster in the database. At block 108, if a match is found then the instructions move to block 105 where the cluster is highlighted as ready to upload. If a match is not found, the user is prompted at block 110 to verify that the cluster has been deleted. From block 103, if a modified cluster 74 is not in the database 14 then, at block 104, the system looks for words that bracket the cluster. If those words are not found then the instruction moves to block 108.

Once all the clusters in the new version 72 of the document are identified and marked in the process above, then at block 112, text which has not been thus marked is viewed. Unmarked text is not highlighted and will be conspicuously visible adjacent to the marked text. The user may then mark the unmarked clusters if they should be marked. At block 114, all of the marked clusters are uploaded to the database 14. The database update function ends at block 116.

The exemplary embodiments shown in the figures and described above illustrate but do not limit the invention. It should be understood that there is no intention to limit the invention to the specific form disclosed; rather, the invention is to cover all modifications, alternative constructions, and equivalents falling within the spirit and scope of the invention as defined in the claims. For example, while the exemplary embodiments illustrate a word processor add-in, the invention is not limited to use as an add-in and may be used in other embodiments. While the invention is not limited to use with a word processor, it is expected that various embodiments of the invention will be particularly useful in such devices. Hence, the foregoing description should not be construed to limit the scope of the invention, which is defined in the following claims.

I claim:

1. A method for generating, maintaining, updating, and augmenting a working database containing documents used as references for other documents in said working database, said method executed as a supplemental program operable within a word processor, said method comprising the steps of:

searching a new document for symbols, retrieving said symbols and replacing said retrieved symbols with text representing said retrieved symbols;

searching said new document for images, retrieving said images and replacing said retrieved images with text representing said retrieved images;

parsing all text within said new document, including general text, said text representing retrieved symbols, and said text representing retrieved images into one or more discrete clusters, said one or more of said discrete clusters separated with markers, said markers positioned by a marker positioning algorithm;

manually moving said markers within said new document, said movement of said markers accomplished by a user manually adjusting said markers to user specified positions within said new document;

deleting said markers within said new document by said user manually deleting said markers;

adding additional markers within said new document by said user manually inserting said additional markers to user specified positions within said new document;

highlighting marked discrete clusters within said new document for verification by said user;

assigning one or more identification codes corresponding one or more said marked discrete clusters within said new document;

uploading said new document into said working database;

verifying the upload of said new document into a file system of said working database by providing a file name and location of said new document within said file system;

searching said working database for text, including general text, said text representing retrieved symbols, and said text representing retrieved images by querying said working database using a search string, said document file name, said document location, and or said identification code representing a discrete cluster;

retrieving one or more relevant parent documents from said working database, said parent documents containing said text relevant to said search;

generating a child document by said user selecting text from one or more discrete clusters within one or more of said relevant parent documents;

inserting said selected text into said child document, said insertion allowing elective retention of parent document identification codes within said inserted text in said child document;

searching said child document for symbols and images, replacing said symbols and said images with text representing said retrieved symbols and images;

manually augmenting said inserted text and within said child document, said augmentation allowing addition to, removal, and/or alteration of said inserted text within said child document, said manual augmentation allowing paraphrasing of said inserted text, parsing all text within said child document, including general text, said text representing retrieved symbols, and said text representing retrieved images into one or more discrete clusters, said one or more of said discrete clusters separated with markers, said markers positioned by a marker positioning algorithm;

manually adjusting said markers around said paraphrasing in said child document, while maintaining matches between the said discrete clusters in said parent documents and said discrete clusters in said child documents;

assigning identification codes to said inserted text within said discrete clusters within said child document;

automatically generating links between said inserted text within said child document to said selected text within one or more of said parent documents corresponding to said inserted text, said links containing said parent document identification codes retained within said inserted text and said child document identification codes;

automatically generating links between said inserted text within said child document and said selected text within one or more of said parent documents corresponding to said inserted text by searching said working database for parent documents containing matches to said inserted text within said discrete clusters of said child documents, said links containing said parent document identification codes and said child document identification codes;

manually generating links between said inserted text within said child document and said selected text within one or more said discrete clusters with said parent documents, said links containing said parent document identification codes and said child document identification codes;

maintaining a registry of said links in said working database, said registry prompting child document authors when one or more of said parent documents are augmented, said prompting giving notice of said augmentation of said parent document;

automatically generating citations for said inserted text within said child document using said links, said automatically generated citations referencing corresponding discrete clusters within said parent documents, said citations generated in a pre-set format, customizable by said user;

inserting said citations into said child document, said citations being movable or augmentable by said user;

uploading said child document into said working database while allowing said user to electively remove said parent document identification codes within said child document prior to uploading;

verifying said upload of said child document into said file system of said working database by providing a file name and file location for said child document in said file system of said working database;

searching said working database for exact matches between the text of said child document and text of all documents stored within said working database and searching said working database for exact matches to said parent document identification codes retained within said child document, if said exact matches are retrieved, said method includes updating positioning of said markers within said child document corresponding to said discrete clusters within said exact matches;

prompting said user when said exact matches are not retrieved and providing a list of best matches between said text of said child document and said discrete clusters of documents stored within said working database, said user selecting a best match which reposition said markers in said child document corresponding to the text of said best match;

uploading said child document containing said new markers;

verifying said upload of said child document containing said new markers into said file system of said working database by providing a file name and file location for said child document in said file system of said working database;

tracking modifications to text, symbols, format, and/or images of said documents within said working database;

alerting said user when said modifications occur;

comparing said documents within said working database by aligning one or more referenced documents with one or more referencing documents and tagging the differences between said documents.

2. The method of claim 1, in which said replaced text representing said retrieved images and said retrieved symbols is code readable by numerous programs including said word processor running said supplemental program.

3. The method of claim 1, in which said marker positioning algorithm detects spaces between and inserts said markers between said text, said images, and said symbols, said marker positioning algorithm adjustable to user preferences.

4. The method of claim 1, in which said identification codes also contain attributes of said discrete cluster corresponding to said position of said discrete cluster in said document, title of said document, and heading of said document.

5. The method of claim 1, in which one or more separate project databases are accessible, said one or more separate project databases operating identically and parallel to said working database.

6. The method of claim 1, in which said markers, said identification codes, and said format attributes are visible only in a formatting background selected by said user working in said word processor environment, said markers, said identification codes, and said format attributes hidden when document is in printable form or viewed outside of said formatting background within said word processor environment.

7. The system of claim 1, in which said parent documents may also be a child document to other parent documents.

8. The system of claim 1, in which said child documents may also be a parent document to other child documents.

9. A system for generating, maintaining, updating, and augmenting a working database containing documents used as references for other documents in said working database through the use of a supplemental program operable within a word processor, comprising: a cpu processor and memory which perform the following:

a symbol search and replace function where one or more symbols within the text of a new document are located and replaced with one or more corresponding codes, said one or more codes searchable by said word processor, said one or more codes having a standardized format identifiable by said word processor and other programs;

an image search and replace function where one or more images within said new document are located and replaced with one or more corresponding textual image references, said one or more textual image references having a standardized format identifiable by said word processor and other programs;

an automated text parsing function where said text and codes representing said symbols, and/or image within said new document are grouped and separated into discrete clusters by markers, initial positioning of said markers is determined by an algorithm, said automated text parsing function having a utility allowing said user to adjust said algorithm settings for initial positioning of said markers;

a manual marker placement function, for placement adjustment, addition, and deletion of said markers within said new document;

a highlighting function for highlighting said one or more marked discrete clusters within said new document, for verification by said user;

an identification code assignment function for assigning one or more discrete identification codes to one or more corresponding said discrete clusters within said new document;

a new document upload function for uploading said new document containing one or more said marked discrete clusters containing one or more corresponding said identification codes, into said working database;

an upload verification function, for verification of the execution of a document upload and verification of a location and name of an uploaded document within a file system of said working database;

a text segment selection function, for searching text of parent documents previously uploaded into said working database, said text segment selection function allowing said user to input a search string to retrieve a list of one or more of said parent documents relevant to said search string, said text segment selection function allowing said user to input a parent document identification code, parent document name, or parent document location on said working database in order to retrieve said relevant parent document text;

a child document development function, where said user may select text from one or more of said parent documents and insert said selected text into a child document, said child document development function allowing said user to electively include or exclude said parent document identification codes when inserting said selected text into said child document;

a text augmentation function where said user may alter, add to, and subtract from said inserted text within said child document, said text augmentation function allowing paraphrasing around said inserted text;

an automated child document text parsing function where said text and said codes representing said symbols, and/or said images within said child document are grouped and separated into discrete clusters by markers;

a marker repositioning function allowing adjustment of positioning of said markers in said child document to exclude said paraphrasing from said discrete clusters in said child document;

a child document identification code assignment function where unique identification codes are assigned to said discrete clusters in said child document;

an automated linking function where one or more links are automatically created between said discrete clusters within said one or more parent documents and said selected text inserted into said child document, said links contain said parent document identification codes and said child document identification codes;

a manual linking function where one or more links are manually inserted by said user between one or more discrete clusters within said parent documents and one or discrete clusters within said child document, said links contain said parent document identification codes and said child document identification codes;

a registry of links maintained by said system, said registry containing all said links between said parent document and said child document identification codes;

an automated citation function where said one or more links are used to create one or more citations in said child document, said one or more citations referencing one or more said discrete clusters within said one or more parent documents;

a child document upload function where said child document is uploaded into said working database, said child document upload function allowing said user to electively remove said parent document identification codes from said inserted text within said child document prior to uploading said child document into said working database, said child document upload retaining said links corresponding to said child document within said registry of links;

a child document update function that searches for exact matches between text within said child document and text within one or more said documents stored within said working database, said child document update function using said child document text as a search string to search all text within said documents stored in said working database and/or said child document update function using said parent document identification codes electively retained in said child document or said parent document identification codes permanently recorded in said links, to search said working database for said exact matches;

document maintenance function using said exact matches to set new markers around said text within said child document so that said discrete clusters of said child document matches said discrete clusters within said referenced parent documents;

a prompting function alerting said user in the event said exact matches are not recovered, said prompting function providing a list of best matches between said text within said child document and text within one or more of said documents stored within said working database, said prompting function allowing said user to select from said list of best matches in order to set markers in said child document corresponding to text of one or more said best matches;

a modified document upload function where said child document with added and or repositioned markers is uploaded into said working database, said modified document upload function either replacing the unmodified child document with a modified child document within said working database, or adding said modified child document to said working database;

a document modification tracking function that monitors said parent documents having said links within said registry of links, said document modification tracking function monitoring said parent document for changes to text, symbols, format, and/or images, said document modification tracking function alerting users of corresponding child documents linked to said monitored parent documents, when one or more said monitored parent documents are modified;

a document comparison function where one or more of said referenced documents are aligned with one or more referencing documents, said document comparison function visually tagging differences between said referenced and referencing documents.

10. The system of claim 9, in which said parent documents may also be a child document to other parent documents.

11. The system of claim 9, in which said child documents may also be a parent document to other child documents.

12. The system in claim 9, in which one or more separate project databases are maintained for said system, said separate project databases operating identically and parallel to said working database.

13. The system of claim 9, in which attributes of said parent document discrete clusters may be attached to said identification codes, said identification codes may include location of said discrete cluster in said parent document, headings of said parent document, and title of said parent document.

14. The system in claim 9, in which said file system is a hierarchical file system.

* * * * *